United States Patent

Lace

[15] 3,698,615

[45] Oct. 17, 1972

[54] SYNCHRONOUS MOTOR MOUNTING SYSTEM FOR SPEED CONTROL

[72] Inventor: Melvin A. Lace, Prospect Heights, Ill.

[73] Assignee: Motorola, Inc., Franklin Park, Ill.

[22] Filed: Feb. 1, 1971

[21] Appl. No.: 111,573

[52] U.S. Cl. ....................226/194, 310/91, 248/15

[51] Int. Cl. ....................B65h 17/20

[58] Field of Search ..............248/15, 26; 310/91, 51; 226/194

[56] References Cited

UNITED STATES PATENTS

| | | | |
|---|---|---|---|
| 3,568,962 | 3/1971 | Janssen | 248/15 |
| 3,482,127 | 12/1967 | Dochterman | 248/15 |
| 3,270,221 | 8/1966 | Shaffer | 310/91 |
| 3,465,182 | 9/1969 | Church et al. | 310/51 |
| 3,500,083 | 3/1970 | Dochterman | 248/15 X |

*Primary Examiner*—Allen N. Knowles
*Attorney*—Mueller & Aichele

[57] ABSTRACT

A synchronous motor mounting system is provided for supporting a drive motor so that variations in motor speed are absorbed within the mounting system to produce a substantially constant linear speed at the output shaft of the motor. The mounting system is used in a tape player to support a motor which operates to transport a magnetic tape and to substantially reduce flutter caused by drive motor speed variations. The mounting system includes a leaf spring for supporting the motor and is mechanically tuned to a resonant frequency that will minimize flutter. The motor is a slow speed motor and can be used for direct drive of the capstan shaft of the tape player without interposing gear reducing means or pulleys between the capstan shaft and motor.

5 Claims, 4 Drawing Figures

PATENTED OCT 17 1972 3,698,615

INVENTOR.
MELVIN A. LACE

BY Mueller & Aichele

ATTORNEYS.

SYNCHRONOUS MOTOR MOUNTING SYSTEM FOR SPEED CONTROL

BACKGROUND OF THE INVENTION

This invention relates generally to an improved mounting system for motors and more particularly to a mounting system which will absorb motor speed variations.

In magnetic tape players used for musical entertainment, and the like, it is desirable to provide motor drive systems whereby substantially constant motor shaft speed is obtained for driving the magnetic tape past a magnetic pick-up so as to reduce flutter to an acceptable level or completely eliminate the same. Flutter is a distortion in sound reproduction caused by an uneven or variable rate of transport of the tape over the magnetic tape head. This variation in tape transport speed will produce a frequency modulation of the reproduced signal at the output of the particular audio system and if the tape speed variation is not controlled within tolerable limits, it will appreciably distort the music being reproduced.

Heretofore, maintaining constant speed of the capstan shaft of a tape player was generally though of as being a function of voltage control or voltage regulation which supplies power to the drive motor and flywheel system. A motor control of this type would sense an increase in motor speed to cause a corresponding decrease in power applied to the motor, and upon sensing a decrease in motor speed will cause a corresponding increase in power applied to the motor. This type of motor speed control must sense an actual speed change before a voltage regulation signal can be affected. Therefore, at best, flutter can be reduced only to a level indicative of speed change sensitivity. In addition, the expense of a voltage regulation speed control system is substantial, and reliability is reduced because of complexity. Still another problem of the prior art is that of achieving substantially instantaneous start-up of a permanent magnet rotor motor of the synchronous inductor type. This type of motor must accelerate to full speed in about one half cycle of the exciting power if it is to run at all. Therefore, this type of motor is ideally suited for operation where starting loads are small. However, where a flywheel or other heavy initial load is used to maintain uniform shaft speed, it is difficult, if not impossible, to start the motor and accelerate the flywheel or load during the short time of one half cycle.

SUMMARY OF THE INVENTION

Accordingly, it is an object of this invention to provide an improved mounting system which functions as a motor speed control to maintain a substantially constant output speed at the tape driving surface of a capstan shaft regardless of motor speed variations.

Another object of this invention is to provide a synchronous motor mounting system which will aid in starting a DC synchronous induction type motor by allowing acceleration of a flywheel or load within one half cycle of the exciting power.

Yet another object of this invention is to provide a synchronous motor mounting system which is mechanically tuned to a resonant frequency selected to minimize flutter within a tape player system.

A feature of this invention is the use of a single leaf spring having the proper spring constant for mechanical resonance, with the ends of the leaf spring being secured to the motor while the center portion of the leaf spring is secured to a fixed motor support member.

Briefly, the motor utilized in one specific arrangement of this invention was a twenty-four pole DC permanent magnet motor of the synchronous inductor motor type. A leaf spring support arrangement has the center of the leaf spring fitting into a slot formed within a capstan housing and the ends of the leaf spring are secured to the motor housing at radially outward portions. By selecting proper spring thickness and spring material, among other things, the resonant frequency of the system was mechanically tuned to 120 cycles per second which produced a 0.1 percent R.M.S. flutter, which is a substantial reduction for most systems and is well within the tolerance of even the most expensive tape drive systems. The motor used in this application is of low power consumption, it being approximately 3 watts, and has an operating efficiency of approximately 30 percent or more. The operating speed of the motor is in the order of 300 RPM and thus is suitable for direct drive of the capstan without the use of a gear pulley or belt reduction system. In a motor of this type it may be desirable to have the pole pieces occupy only about 10 percent to 50 percent of the total alloted pole area. That is, with a 24 pole permanent magnet synchronous inductor motor there is alloted 15° or arcuate space for each pole. Thus the actual pole piece may occupy only 1.5° to 1.5° of the arcuate pole space. Also, the resilient mounting of the motor housing allows the housing to react to sudden acceleration torque and thus provide increased relative movement between the motor armature and the motor housing. This insures that the motor will come up to speed in the necessary one half cycle for starting power.

The low power consumption of this motor provides for a minimum temperature rise during long periods of operation and thus the temperature of the capstan shaft, which is direct coupled to the motor and in contact with the magnetic tape, is maintained at a minimum level so as not to overheat the tape during transport. Also, the low temperature rise of the capstan shaft insures that no sticking or deformation of the pressure roller will occur when one is used.

DESCRIPTION OF THE ILLUSTRATED EMBODIMENT

The synchronous motor mounting of this invention has particular utility when used in conjunction with a magnetic tape player, particularly of the cartridge type, but it will be understood that will not limit its use in other apparatus where a constant drive speed is desired. Other such apparatus may include, for example, turn tables or record changers, or referenced speed mechanisms, or the like.

Figure 1:
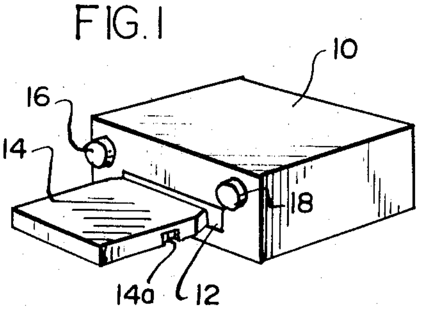
FIG. 1 is a diagrammatic perspective view of a tape player utilizing the synchronous motor mounting of this invention.

Referring now to FIG. 1 there is seen a magnetic tape player designated generally by reference numeral 10 and it includes an entryway 12 for receiving a cartridge 14. A quantity of endless tape is supported within the cartridge 14 and tape transport and magnetic head means are provided within the player 10, as is well known in the art. The cartridge 14 may include an indexing notch 14*a* which receives a camming wheel or lever within the player 10 to urge the cartridge to a full inserted position for playing. Volume and tone controls 16 and 18, respectively, may be provided as necessary.

Figure 3:
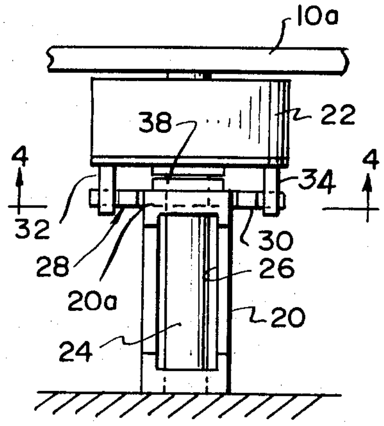
FIG. 3 is an elevational fragmentary view of the synchronous motor mounting of this invention.
Figure 2:
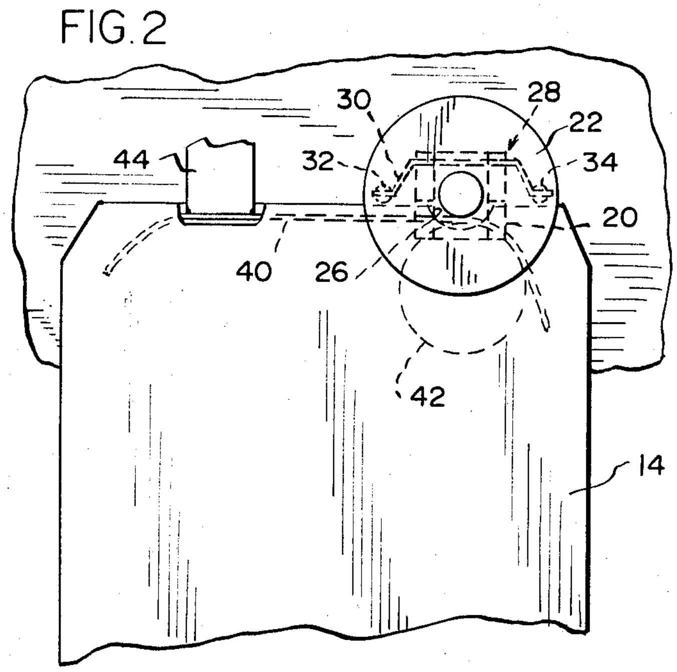
FIG. 2 is a top fragmentary view showing a tape cartridge inserted in the tape player of FIG. 1 to illustrate the relationship of the motor mounting and a capstan drive shaft used for transporting the tape within a tape cartridge.
Figure 4:
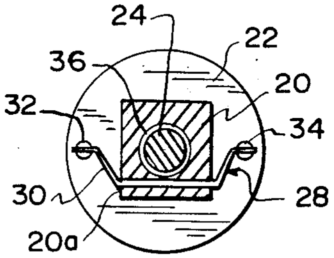
FIG. 4 is a view taken along section line 4—4 of FIG. 3.

To transport the tape within the cartridge 14 the tape player 10 is provided with a synchronous motor mounting system constructed in accordance with this invention. This is illustrated in FIGS. 3 and 4, which shows a mounting support 20 being positioned between support walls 10*a* and 10*b* of the player 10 and may be formed as an integral part of the support wall 10*b*. The mounting support 20 is preferably a capstan housing over which is positioned a drive motor 22 for direct coupling with a capstan shaft 24. The capstan shaft 24 provides drive means which is exposed through an opening 26 of the capstan housing 20 in the usual manner to transport the magnetic tape 40 past a transducer pick-up head 44, as best seen in FIG. 2. To facilitate transport of the tape 40 a pressure wheel 42 is provided within the cartridge 14 and cooperates with the exposed portion of the capstan shaft 24 to pinch the tape therebetween and transport the same during operation.

Most advantageously, resilient means designated generally by reference numeral 28 is positioned between the drive motor 22 and the mounting support 20. The resilient means is mechanically tuned to a frequency that will absorb motor speed variations caused during energized operation of the motor thus providing a substantially constant speed of the capstan shaft 24. That is, instead of securely mounting the motor housing to the support within the tape player 10, the motor housing is resiliently mounted so that variations in motor speed, which cause torque changes between the motor housing and the capstan shaft 24, will be absorbed as changes in motor position by the resilient support. The resilient means is tuned to a frequency within a range of about 50 to 200 Hz and preferably, tuned to a frequency of about 120 Hz when the motor is a 24 pole permanent magnet synchronous inductor motor. This will produce minimum flutter.

In the illustrated embodiment disclosed herein, the resilient means 28 includes a leaf spring 30 having its ends secured to pins 32 and 34 radially outward of the central axis of the motor 22. The central portion of the leaf spring 30 is fitted into a slot 20*a* within the capstan housing 20 and thus the motor is free to vibrate, i.e., absorb variations in motor speed, at a frequency dependent upon the spring constant, as well as other parameters. Here the leaf spring is shown bent at the central portion to be displaced from the ends inserted into the pins 32 and 34 thus providing free passage of the capstan shaft 24 through the capstan housing 20. However, the cross-sectional configuration of the leaf spring 30 may take various forms, dependent upon any particular use involved.

A bushing 36 may be provided between the capstan housing 20 and the capstan shaft 24, to provide a smooth bearing surface for ease of rotation. Also, a thrust washer 38 may be provided between the upper end of the capstan housing 20 and the drive motor 22 upon which a major portion or all of the weight of the drive motor may be supported.

By providing a synchronous mounting system for a tape drive motor in accordance with this invention the speed of rotation of the capstan shaft 24 is maintained as substantially constant and unaffected by variations in motor speed. For example, the flutter measure with an R.M.S. meter of a system using a particular motor will be approximately 3½ percent when the drive motor is firmly, not resiliently, mounted within the tape player 10. On the other hand, by resiliently mounting the drive motor 10, and tuning the drive motor in accordance with the particular physical configuration thereof, the flutter is reduced substantially, as for example, to about 0.1 percent in comparison.

What has been described is a simple and efficient means for maintaining the speed of rotation of a capstan shaft substantially constant and independent of motor speed variations as well as a mounting system which allows improved start up of DC synchronous induction type motors.

I claim:

1. A motor mounting system for a magnetic tape player which receives and transports a quantity of magnetic tape, comprising in combination, tape support means for supporting the tape in a predetermined relation so that the tape will be driven past a magnetic pick-up, a mounting support, a capstan shaft extending through said mounting support and exposed by an opening formed in said mounting support so that the tape engages the capstan shaft for transport thereof, a motor having an output shaft coupled to said capstan shaft to drive the same, and a leaf spring fastened to said motor and extending in a direction transverse to the axis of rotation of said motor and connected to said mounting support, whereby variations in speed of rotation on said motor will be absorbed by said leaf spring thus maintaining said capstan shaft at a substantially constant speed.

2. The motor mounting system of claim 1 wherein said leaf spring is selected to mechanically tune the motor mass connected thereto to a frequency within the range of 50 to 200 cps.

3. The motor mounting system of claim 2 wherein said leaf spring is selected to mechanically tune the motor mass connected thereto to a frequency of 120 cps.

4. A motor mounting system comprising in combination, a motor mounting support including a capstan housing, a motor, a capstan shaft extending through said capstan housing for transporting a magnetic tape, a leaf spring, said leaf spring being coupled to said motor and having the ends thereof secured to said motor and the central portion thereof secured to said capstan housing, said leaf spring being mechanically tuned to a frequency that will absorb motor speed variations thus providing a substantially constant speed of said capstan shaft.

5. The motor mounting system of claim 4 wherein said capstan shaft is directly driven by said motor.

* * * * *